Sept. 1, 1925.
M. M. UPSON
PILE HEADING MACHINE
Filed July 19, 1923
1,551,915
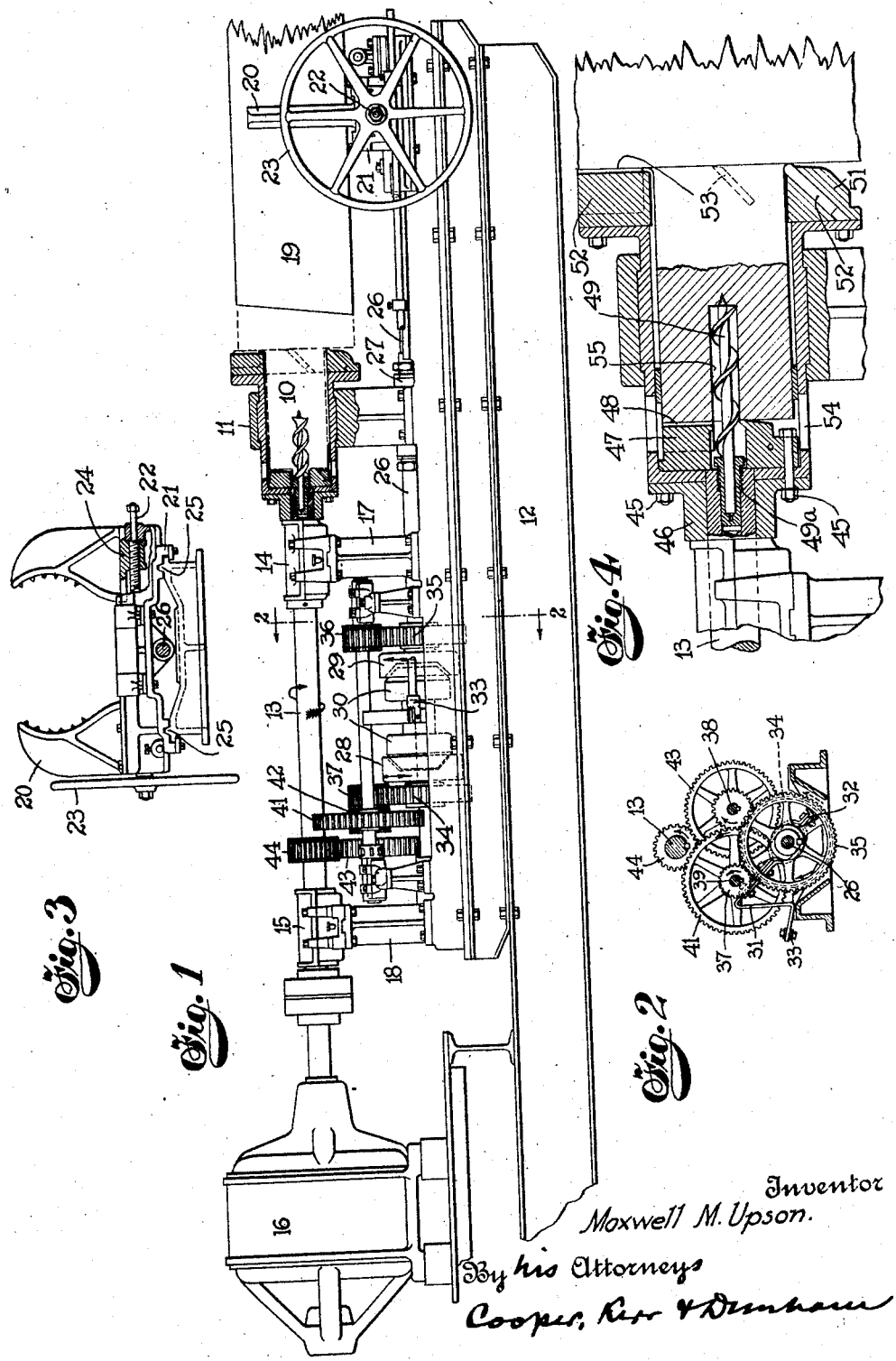
Inventor
Maxwell M. Upson.
By his Attorneys
Cooper, Kerr & Dunham Patented Sept. 1, 1925.

1,551,915

UNITED STATES PATENT OFFICE.

MAXWELL M. UPSON, OF ENGLEWOOD, NEW JERSEY.

PILE-HEADING MACHINE.

Application filed July 19, 1923. Serial No. 652,488.

*To all whom it may concern:*

Be it known that I, MAXWELL M. UPSON, a citizen of the United States of America, residing at Englewood, in the county of Bergen and State of New Jersey, have invented certain new and useful Improvements in Pile-Heading Machines, of which the following is a full, clear, and exact description.

This invention relates to machines for heading piles, more particularly the wooden portion of so-called composite piles, the lower portion or section of which is of wood and the upper of concrete. In a type of composite pile now in extensive use the wood section is provided at its upper end with a tenon, which fits into a mortise in the lower end of the concrete section, and the two are anchored together by means which requires a socket or recess extending axially into the tenon. My present invention has for its chief object to provide a machine by which the tenon and socket can be formed on the wood pile rapidly and accurately in one operation. To this and other ends the invention consists in the novel features hereinafter described.

In its preferred form the machine in which the invention is embodied comprises a turning and boring head, by which the end of the pile is turned down to form the tenon and bored out to form the socket; a work-holder in which the pile is supported in axial alignment with the head; and mechanism for producing a relative movement of rotation, and relative movement of approach and recession, between the head and the work-holder.

One form of the invention is illustrated in the accompanying drawings, in which—

Fig. 1 is a side view of the machine.

Fig. 2 is a cross section about on line 2—2 of Fig. 1.

Fig. 3 is an end view from the right of Fig. 1, showing the clamp and carriage by which the pile is held against rotation and is carried into operative engagement with the revolving head which turns the tenon and bores out the socket.

Fig. 4 is a detail longitudinal section of the head.

The head 10, described in detail hereinafter, is rotatably mounted in a stock 11 fixed on the bed 12 and at its rear end it is fixed to the driving shaft 13, which is rotated in bearings 14, 15, by direct drive from a motor 16. The bearings 14, 15 are carried by standards 17, 18.

A pile which is to be headed is shown at 19, firmly gripped by a clamp composed of opposed transversely movable jaws 20, Fig. 3. The latter are mounted on a carriage 21 and are shifted in and out equally thereon to grip and release the work by means of an axially stationary actuating shaft 22, rotated by a hand wheel 23 and provided with right and left hand threads engaging suitable nuts 24 on the jaws.

The carriage 21 is shiftable longitudinally of the machine on rails 25 by means of a longitudinal extending axially stationary feed screw 26, Figs. 1, 2 and 3, cooperating with a nut 27 on the carriage, Fig. 3. The feed screw is driven from the shaft 13 in either direction at will, to advance and retract the work carriage, by the following mechanism.

On the unthreaded portion of the feed screw, and freely rotatable but axially stationary thereon, are two clutch members 28, 29, and between them an axially shiftable clutch member 30 splined on the feed screw, to cooperate with either of the other members at will. The clutch parts named can be of any suitable type, but for the sake of simplicity I have shown them as of the conventional cup-and-cone class. The cones 30 are shifted by a shift lever 31, Fig. 2, fulcrumed at 32 and actuated by a shifter rod 33, Fig. 1. The clutch members 28 and 29 are rotated in opposite directions, as indicated by the arrows in Fig. 1, by gears 34, 35, which are rigidly connected to the members mentioned and which are themselves rotated by pinions 36, 37 (see also Fig. 2) on countershafts 38, 39. The latter shaft is driven by a gear 41 from a pinion 42 on shaft 38, which is itself driven by a gear 43 from a pinion 44 on the main driving shaft 13. From the foregoing it will be seen that with the driving shaft running in the direction of the arrow applied to it in Fig. 1, that is, clockwise as viewed from the left, the clutch member 28 will be rotated in the same direction and the member 29 in the opposite direction. The feed screw 26 having a right hand thread, the carriage 21 will be advanced, toward the head 10, when the clutch member 30 is engaged with member 28, and will be retracted, away from the head, when the member 29 is engaged, as will be readily understood.

The head 10 comprises a hollow cylinder, the internal diameter of which is slightly larger than that of the tenon to be formed on the pile. The cylinder is fastened by bolts 45 to the flange of collar 46, keyed or pinned on the driving shaft 13, and inside of the cylinder, fastened by the same bolts, is a plurality of tool holders 47, two or more in number, carrying inclined facing knives, as 48, by which the end of the tenon, shown in Fig. 4, is trued up and faced off at right angles to the axis of the tenon. At the axis of the head is an auger bit 49, removably mounted in a chuck 49ª for boring out the socket in the end of the tenon. At its forward end of the head 10 the cylinder is provided with a radial flange 50, to which is bolted a plurality of tool holders, one or more of which, as 51, carry inclined gouges (one gouge being shown at 52ª) to form the tenon, while others, as 52, carry inclined shouldering knives 53 to cut back the wood left around the tenon by the gouges and form the square shoulder at the base of the tenon. Openings 54 are provided in the head for the escape of chips and borings.

The operation of the machine will now be readily understood.

The pile being clamped on the carriage 21 in axial alignment with the head 10 (the other end of the pile being loosely supported in any convenient manner), the machine is started, rotating the head and the feed screw. The pile is advanced by the latter, and first meets the gouge or gouges 51 and the shouldering knives 53, which, as the advance continues, shape the tenon rapidly and accurately. Next the end of the partially formed tenon meets the bit 49, by which the socket 55 is bored out at the axis of the tenon. Finally the rough end of the tenon meets the facing knives 48 and is faced off square to the axis. This operation finished, the rotation of the feed screw is reversed by shifting the clutch member 30, so that the pile is retracted and the tenon withdrawn from the head. When the carriage has moved back far enough the machine is stopped, the clamp opened, and the pile removed.

It is to be understood that the invention is not limited to the construction herein specifically illustrated and described but can be embodied in other forms without departure from its spirit as defined by the following claims.

I claim:

1. In a pile-heading machine, a revoluble head open forwardly to receive the end of the pile, tenoning gouges at the open end of the head to form a tenon, shouldering knives at the open end of the head to remove wood outside of the gouges and form a shoulder at the base of the tenon, and facing knives at the inner end of the head to face the end of the tenon.

2. In a pile-heading machine, a tenoning and socketing head comprising a hollow cylinder having a closed end and a circumferentially flanged open end, tenoning tools carried by the flange on the open end, a boring bit inside the cylinder at the axis thereof and extending forwardly from the closed end, facing knives around the bit at the closed end of the cylinder, holders for the facing knives, a driving collar in rear of the closed end of the cylinder and having a circumferential flange, and bolts extending through the facing-knife holders, the end of the cylinder, and the flange on the driving collar, to fasten the facing-knife holders in the cylinder and the cylinder on the driving collar.

In testimony whereof I hereto affix my signature.

MAXWELL M. UPSON.